Jan. 7, 1969 B. C. HAYS 3,420,968

SERVICE OBSERVING SYSTEM

Filed Aug. 20, 1965 Sheet 1 of 6

INVENTOR
B. C. HAYS
BY S E Hollander
ATTORNEY

United States Patent Office 3,420,968
Patented Jan. 7, 1969

3,420,968

SERVICE OBSERVING SYSTEM

Bruce C. Hays, Omaha, Nebr., assignor to American Telephone and Telegraph Company, New York, N.Y., a corporation of New York Filed Aug. 20, 1965, Ser. No. 481,247
U.S. Cl. 179—175.2 16 Claims
Int. Cl. H04m 3/22

ABSTRACT OF THE DISCLOSURE

A telephone system is disclosed having service observing equipment which is accessible from a conventional telephone station. The service observing equipment is rendered operative to authorized persons by a special "unlocking" signal, while other signals will disable the service observing equipment to prevent its use by unauthorized persons.

This invention relates to telephone systems and particularly to arrangements for monitoring on telephone circuits in such systems.

In a more particular aspect this invention relates to telephone service observing arrangements wherein the observer can monitor on telephone circuits at a remote location.

In a very particular aspect this invention relates to telephone service observing systems wherein the observer can monitor circuits at a remote location using regular network facilities.

In telephone systems various arrangements are utilized to measure and evaluate the quality of service offered to customers. While traffic measuring devices can be employed for automatically recording circuit busy conditions and the like, and while automatic testing equipment is available for the routine testing of telephone circuits, it is often desirable to monitor calls in progress to observe the manner in which certain calls are handled.

For example, in modern day automatic telephony the use of an operator to assist in completing calls has been minimized to the extent that an operator's assistance is generally only required on special or unusual calls as distinguished from calls of a more routine nature which the customer can complete by himself. Since the operator has become more specialized and has less frequent contact with the general public, it is important from a customer relations standpoint that the operator is fully trained to perform her service in the most efficient and expeditious manner.

As part of assuring continuing good service, it is appropriate to monitor telephone circuits such as those used by operators when they are assisting in the completion of calls. In particular, an operator's position circuit, cord circuits and trunk circuits connected to a switchboard position are often observed to evaluate the service being rendered by the operator. The service observing function can be accomplished in a variety of ways, but generally, an observer at a centralized desk has access over special service observing circuits to several remote locations at which observations are to be performed. In one known system, for example, all of the telephone circuits to be monitored are extended to the centralized desk where the service observer can select and bridge her receiver to each of the circuits to monitor calls in progress. While this system enables the observer to select a particular circuit for observation, it is obvious that such an arrangement requires a multiplicity of equipment since each circuit to be monitored, in addition to its regular termination in a telephone switching equipment, must also be terminated at the special service observing desk.

In the alternative, service observing arrangements are known wherein the observer can monitor any one of the plurality of remotely located telephone circuits over a lesser number of special observing trunks between the remotely located circuits and the centralized service observing desk. These arrangements can be classified into two general categories, the first being an arrangement whereby the seizure of any of the remotely located telephone circuits automatically connects the circuit to the service observing desk over a common service observing trunk, and the second being an arrangement whereby the observer can select over the common service observing trunk any one of the remotely located telephone circuits. While the latter arrangements are quite flexible, observations must still be made from the centralized desk over the special service observing trunks.

It is therefore one object of my invention to improve telephone service observing arrangements by enabling the observer to monitor from various locations in the network.

In addition to the economy realized by a centralized service observing desk, these arrangements also help to minimize a possibility of unauthorized observations on telephone circuits by divorcing the special service observing trunks from the regular telephone system. Of course, with such a system special service observing trunks must be provided to each remote location, and these trunks cannot be used for other service during periods when observations are not being made. On the other hand, if regular network facilities are used, safeguards must be provided to preclude the possibility of unauthorized access to the service observing equipment.

It is therefore another object of my invention to improve remote service observing systems whereby monitoring can be accomplished over the regular telephone network facilities only by authorized personnel.

In accordance with one illustrative embodiment of my invention, service observing units are furnished at each location where telephone circuits are to be monitored, and each telephone circuit is coupled to the service observing unit. The observer can establish a connection from any station in the network to any one of the service observing units by dialing the number which has been assigned for access to the particular unit. Although the observer can connect to a particular service observing unit in this manner, the unit must first be "unlocked" before any observations can be made. This is accomplished by transmitting a special unlocking code over the established connection to the unit. Once the service observing unit has been unlocked, additional codes can be transmitted over the connection by the observer to select any one of the telephone circuits for observation.

While the numbers assigned for access to the various service observing units and the unlocking codes are known only to service observing personnel, additional safeguards have been provided to insure against unauthorized use of the arrangement. For example, if someone who has inadvertently been connected to a service observing unit, attempts to unlock the unit by the application of various codes selected at random, a lockout circuit is actuated to prevent the service observing unit from being unlocked. In addition, an alarm is actuated to alert the appropriate maintenance personnel that unauthorized persons are trying to use the service observing arrangement.

One feature of my invention is found in a telephone service observing arrangement which is accessible from various stations in the network.

Another feature of my invention is found in a service observing arrangement wherein the operator can select at a remote location any one of a plurality of telephone circuits for observation without releasing the connection between her station and the remote service observing unit.

A further feature of my invention is found in an arrangement for preventing unauthorized access to the service observing circuit by the random application of codes in an attempt to discover the correct code for unlocking the service observing unit.

These and other objects and features of the invention will become readily apparent from the following description with respect to the drawing in which.

*Arrangement of equipment*

Before describing the over-all operation of the system contemplated, a brief description of the arrangement of the equipment will be given.

Figure 1:
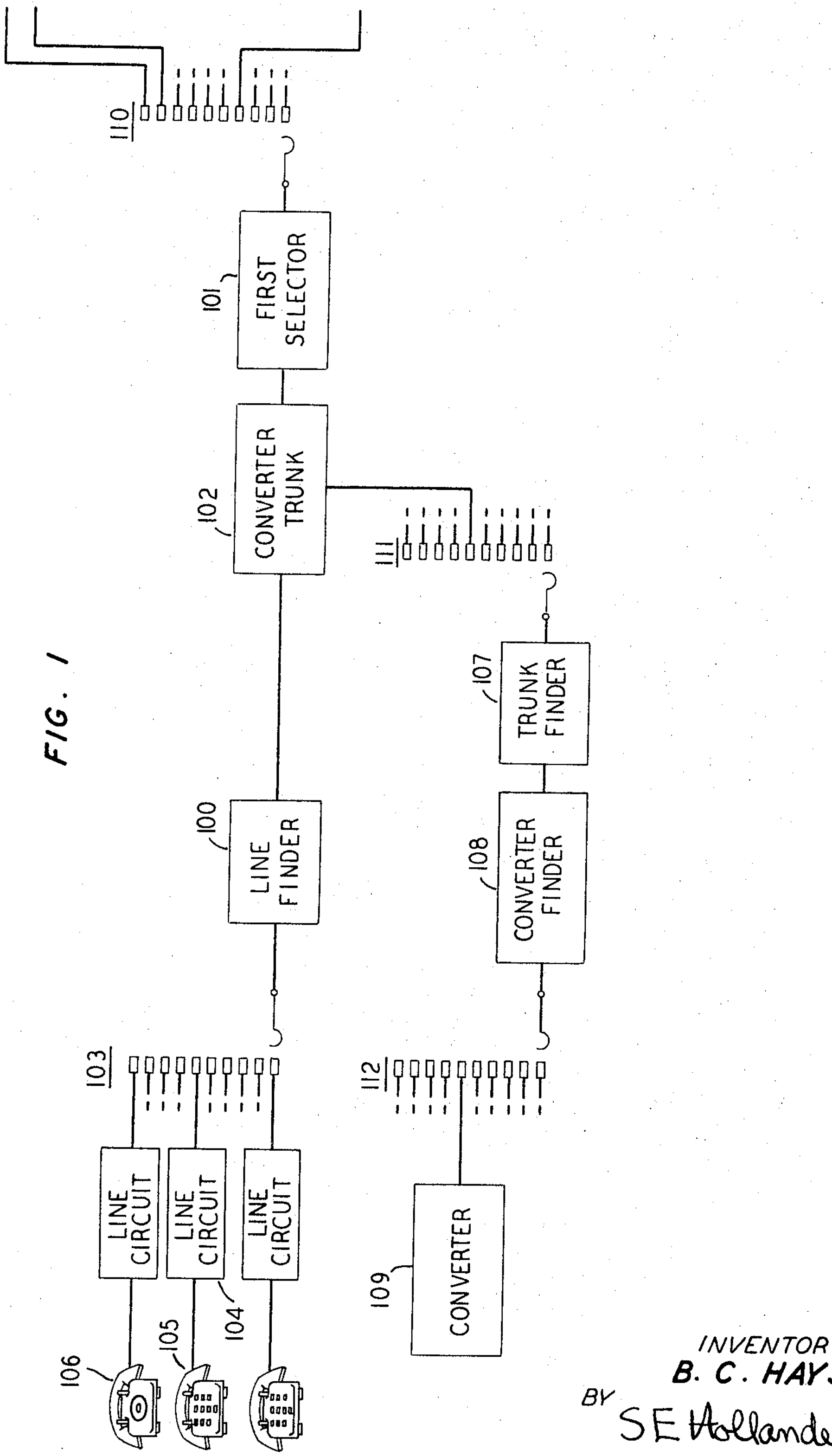
FIG. 1 shows a block diagram of a typical step-by-step switching office.

Turning first to FIG. 1 there is shown a block diagram of a typical step-by-step telephone switching office comprising a line finder 100 and a first selector 101 with converter trunk 102 interposed therebetween. Line finders such as line finder 100 are well known and comprise a bank of contacts 103 on which line circuits such as line circuit 104 are terminated. When the customer at station 105 lifts his receiver to originate a call, line circuit 104 operates to mark a terminal in contact bank 103, and line finder 100 searches over these terminals to find the line requesting service as indicated by the marked terminal.

It will be noted that the switching office in FIG. 1 serves different types of stations, that is, station 106 having a conventional dial and station 105 having a multifrequency keyset. While the present invention utilizes multifrequency signaling, it is not limited thereto, nevertheless it will be appreciated that multifrequency signals offer the advantages of being fast and reliable and permit signaling through certain circuits which do not normally pass direct-current dial pulses.

To facilitate the handling of calls from regular dial stations such as 106 and multifrequency keyset stations such as station 105, the switching office in FIG. 1 is provided with a converter trunk 102. When line finder 100 acknowledges the request for service, trunk finder 107 and converter finder 108 find an idle converter 109 and connect the converter to the converter trunk 102 interposed between line finder 100 and first selector 101. If the first digit transmitted by the calling customer comprises dial pulses, the converter is dropped off and the dial pulses directly drive the first selector 101 and subsequent step-by-step switches, such as connector 200 in FIG. 2. If, however, the call is originated from a station having multifrequency signaling such as station 105, the converter converts the multifrequency signals to dial pulses which in turn drive the first selector 101 and connector switch 200.

An example of a system serving dial pulse and multifrequency customer stations is set forth in Patent 3,133,155 to F. C. Kuchas of May 12, 1964 and the Kuchas patent is hereby incorporated by reference as though fully disclosed herein.

As is well known in the art, the first selector switch 101 comprises a contact bank 110 on which trunks to connectors, other selectors or to other offices are terminated. The connector switch 200, on the other hand, comprises contact bank 201 which is utilized for completing calls to customer lines, in contrast with the line finder 100 which is used on calls originating from a particular line.

Turning now to FIGS. 2–6 there is shown a service observing unit connected to one of the terminals on bank 201 of connector switch 200. The service observing unit comprises amplifier 202, for amplifying the transmission received from telephone circuits which are being monitored, and units selection circuit 500 and tens selection circuits 501 and 502 in FIG. 5 for connecting amplifier 202 to various telephone circuits. In the illustrative embodiment, amplifier 202 can be connected to monitor on trunks 503 and 504 which connect to switchboard 505 and on lines 506 and 507, but it will be obvious to those skilled in the art that other types of telephone circuits can readily be monitored depending on the particular service needs.

Figure 3:
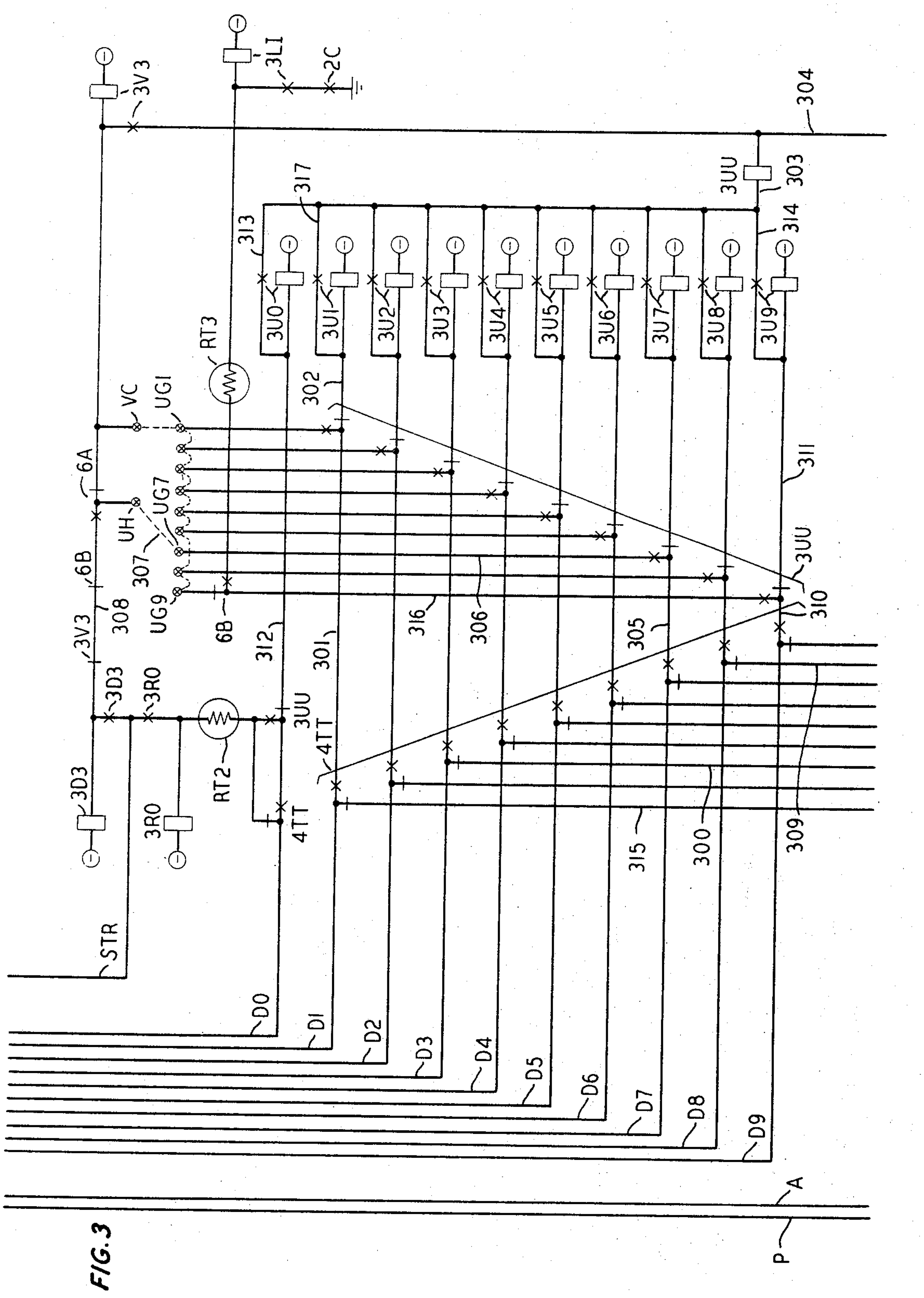
Figure 4:
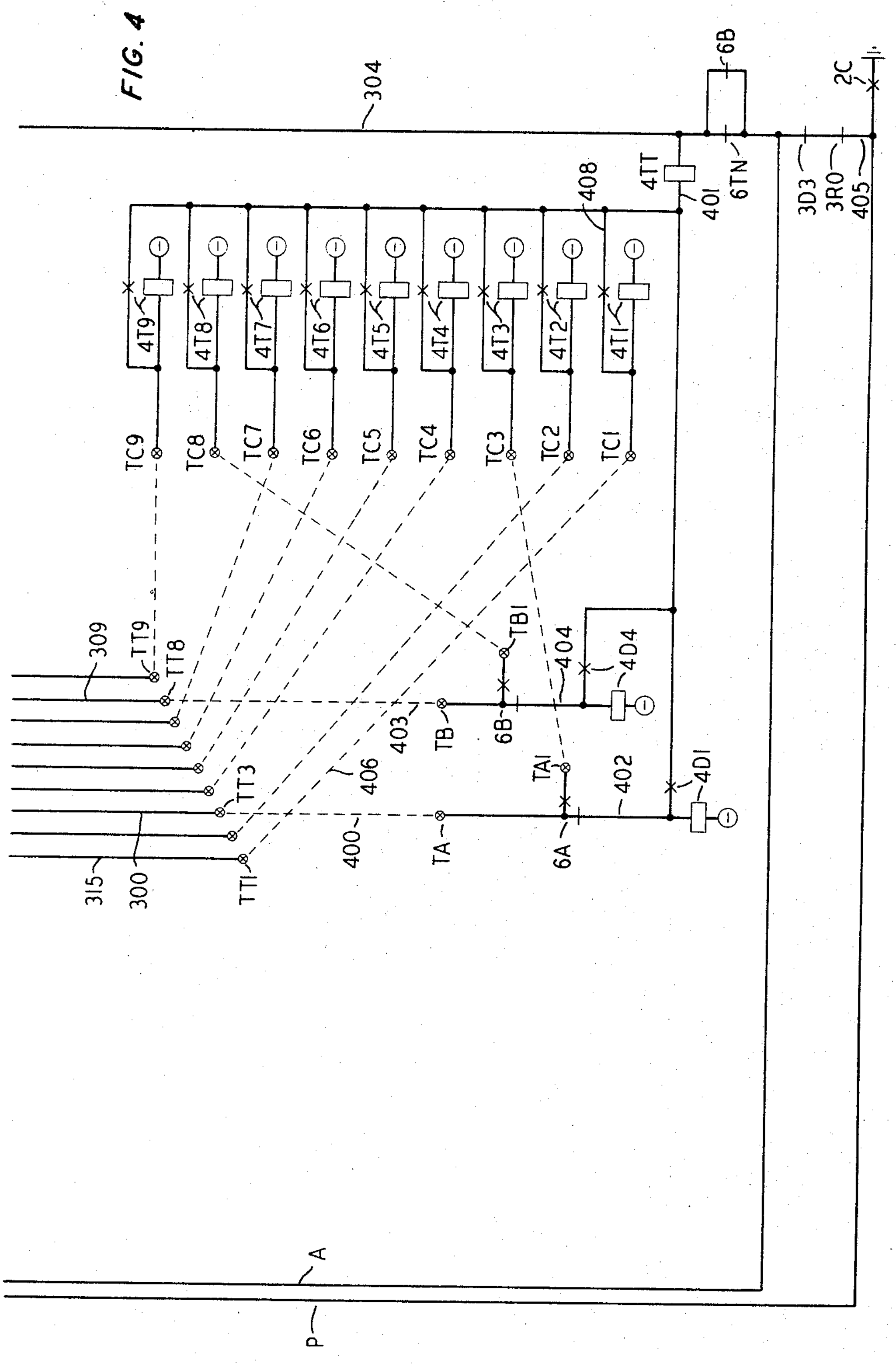

The service observing unit also comprises a multifrequency receiver 214 which receives digital information in the form of tone burst signals from the observer and converts these indications for registration on the registration relays in FIGS. 3 and 4.

Figures 6, 7:
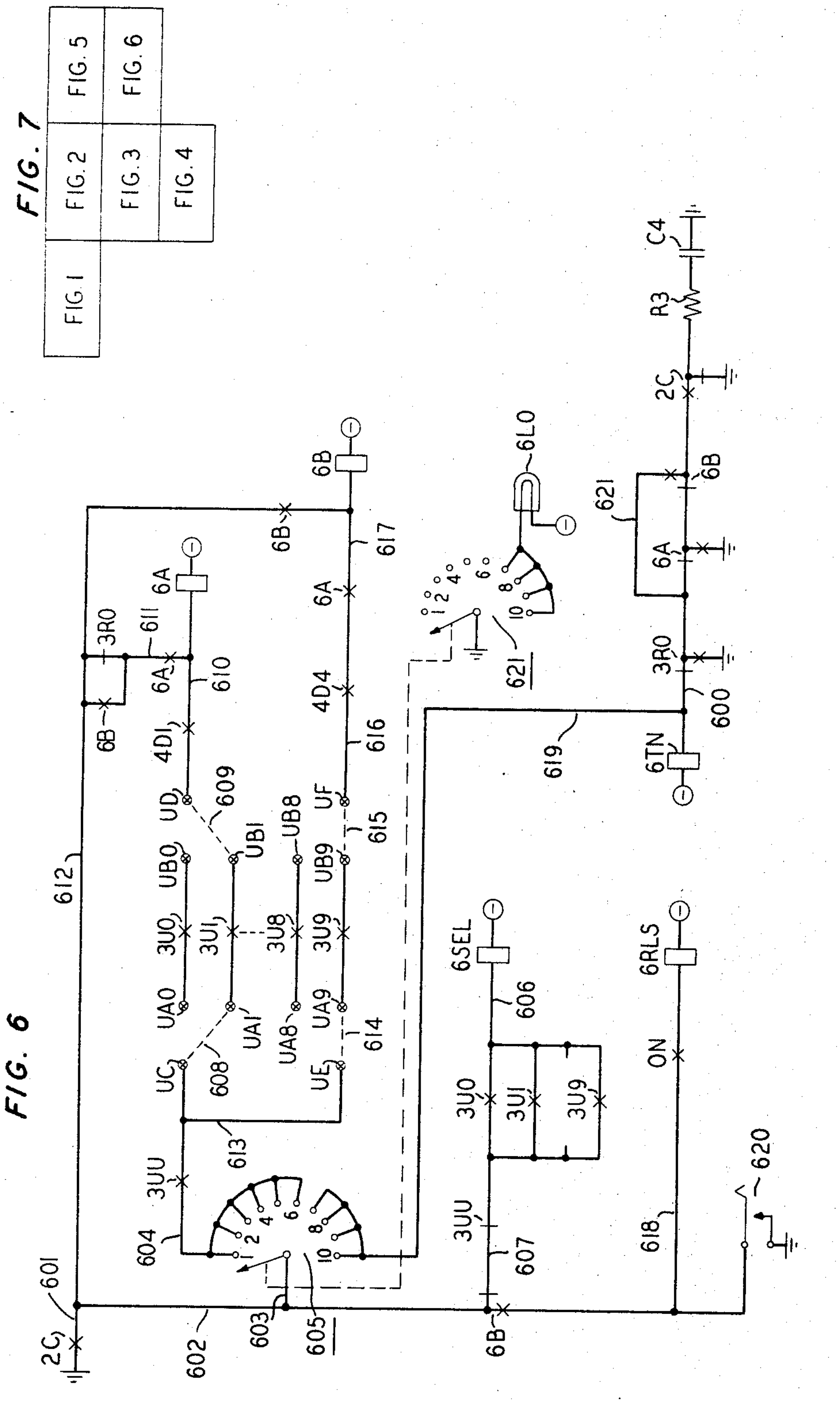
FIG. 7 shows the arrangement of FIGS. 1–6.

In addition, the service observing unit is provided with circuitry in FIG. 6 for locking out the monitoring function should an unauthorized caller gain access to the unit and attempt to unlock the unit by applying codes at random.

*Description of operation*

To further illustrate the novel features of my invention, a description of the operation of the circuit will now be given.

Figure 5:
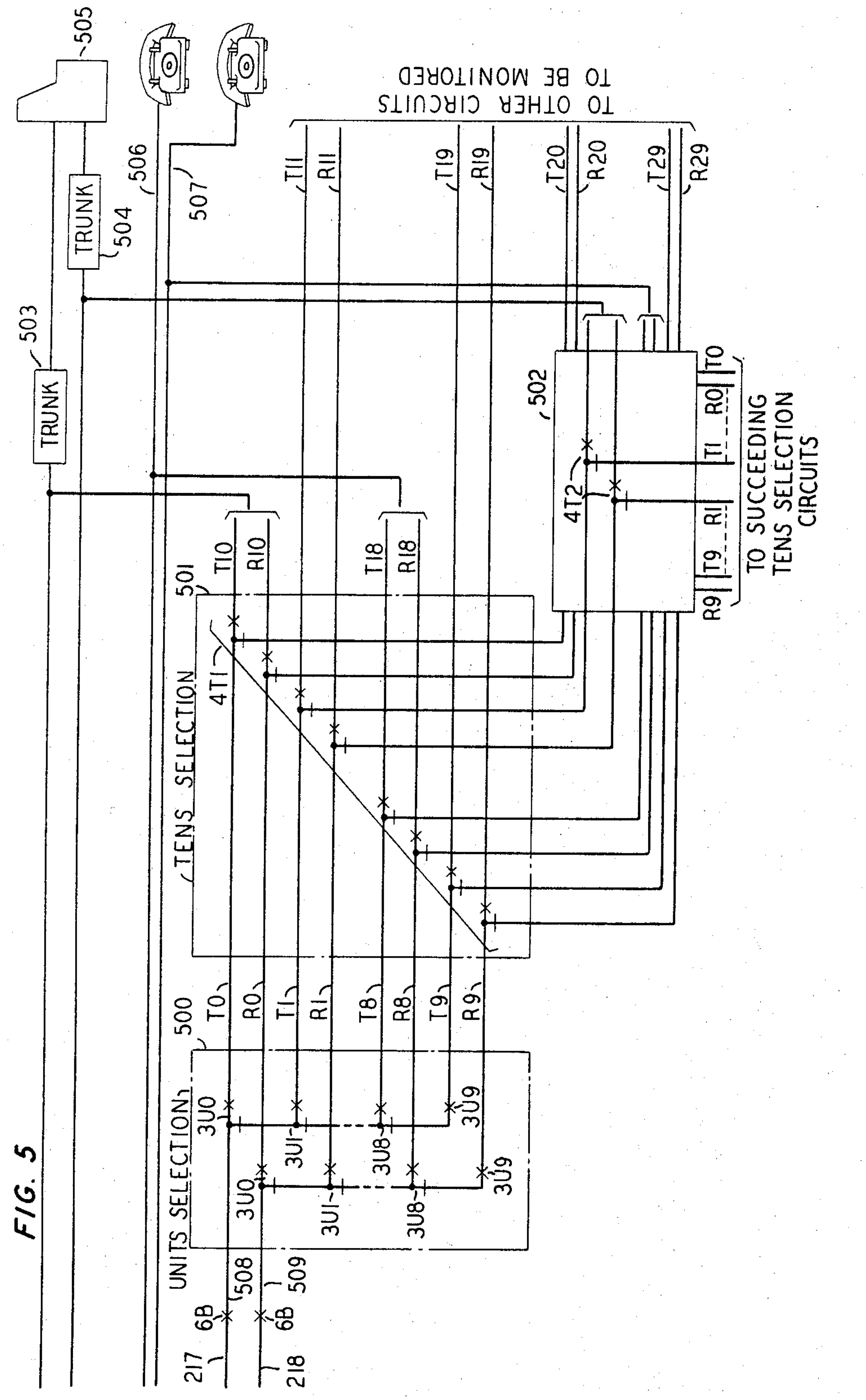

Let it be assumed that the observer is located at station 105 in FIG. 1 and wishes to monitor on operator trunk circuits 503 and 504 in FIG. 5. The observer lifts the receiver at station 105 and places a call to the service observing unit by keypulsing the telephone number assigned to the unit. For illustrative purposes it will be assumed that the telephone number assigned to the service observing unit is 449, and since the unit is served by the same switching office as the observer, a central office designation code will not have to be dialed. Of course, it will be appreciated that the observer and the service observing unit could be located at different offices within the teachings of my invention.

When the receiver at station 105 is lifted, line circuit 104 operates, and line finder 100 hunts over the terminals in bank 103 looking for the terminal marked by the line circuit which is requesting service. In addition, converter trunk 102 is actuated by line finder 100 and causes trunk finder 107 to hunt for the converter trunk on contact bank 111 while converter finder 108 hunts over contact bank 112 for an idle converter, such as converter 109. When converter 109 is connected to the converter finder 108 and trunk finder 107 is connected to converter trunk 102, dial tone is transmitted back to station 105. The observer can now keypulse the digits 449 to establish a connection to the service observing unit.

The first digit 4 transmitted by the observer is received by converter 109 which changes the multifrequency signals to dial pulses driving first selector 101 to the fourth level The second digit 4 is converted in the same manner to drive the connector switch 200 to its fourth level while the last digit 9 causes the connector switch to rotate to the ninth terminal on the fourth level thus stopping on terminal 449 which is the number terminal assigned to the service observing unit.

The connector switch functions in a well-known manner and transmits an interrupted alternating-current ringing signal over the tip and ring leads 203 and 204, respectively, to the service observing unit. More specifically, a circuit can be traced from the connector switch over conductor 204, through resistance R1, capacitor C1, through normal contacts of relay 2C, through the winding of ringing relay 2R, through thermistor RT1, through diode D1, through normal contacts of relay 2C, through capacitor C2 and resistance R2 and back over tip conductor 203 to the connector switch 200. Relay 2R operates in this circuit during hte ringing interval and closes a circuit to complete a path for tripping the central office ringing signal and for operating hold relay 2H. This circuit can be traced from battery (not shown) in the connector switch, over ring conductor 204, through the lower winding of relay 2H, through operated contacts of relay 2R, through the upper winding of relay 2H and back over tip conductor 203 to ground (not shown) in the connector switch. Relay 2H in operating provides its own locking circuit, and when the central office ringing signal has been tripped, relay 2R releases. With relay 2R released and relay 2H operated, ground is connected through operated contacts of relay 2H, over conductor 205, through normal contacts of relay 2R and through the winding of cut-through relay 2C to operate relay 2C. Relay 2C, in operating, extends tip conductor 203 and ring conductor 204 through coupling capacitors C2 and C1 to conductors 206 and 207, respectively, and to amplifier 202. In addition, relay 2C extends ground over conductor 208 to turn on amplifier 202 in preparation for monitoring.

Turning now to FIG. 6 there is shown a capacitor C4 which has its one side connected directly to ground and the other side connected through resistance R3 and normal contacts of relay 2C to ground so that capacitor C4 remains discharged. When relay 2C operates, however, a circuit is completed through the winding of tone relay 6TN to charge capacitor C4 and momentarily operates relay 6TN. This circuit can be traced from battery through the winding of relay 6TN, over conductor 600, through normal contacts of relays 3RO, 6A and 6B, through operated contacts of relay 2C and through resistance R3 to one side of capacitor C4. As current flows through this path to charge capacitor C4, tone relay 6TN is operated. When capacitor C4 is fully charged the current ceases to flow, the winding of relay 6TN becomes de-energized, resulting in relay 6TN holding operated for approximately two to three seconds.

Figure 2:
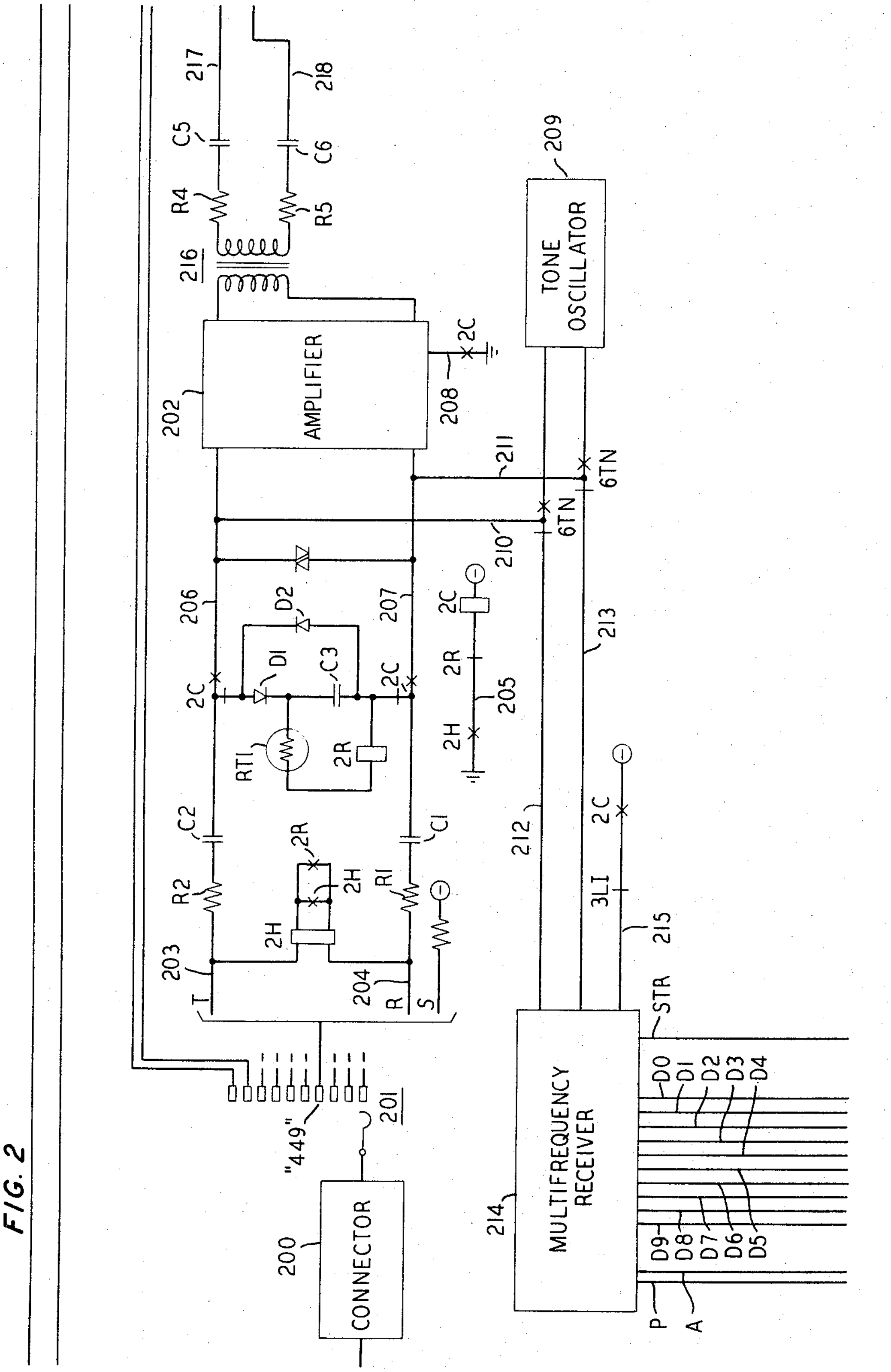
FIGS. 2–6 show a service observing unit connected to the switching office in FIG. 1.

In FIG. 2 there is shown a tone oscillator 209. During the short interval when relay 6TN is operated, tone oscillator 209 is momentarily connected via conductors 210 and 211 to conductors 206 and 207 which are coupled to the tip and ring transmission conductors of the established connection. By momentarily connecting tone oscillator 209 to the connection, the calling observer receives a tone burst informing her that she has been connected to the service observing unit and can now trnansmit the special code to unlock the unit for monitoring. The subsequent release of relay 6TN disconnects the tone oscillator from the connection and reconnects the observer's keyset with multifrequency receiver 214 over conductors 210–213.

It will be recalled from the prior discussion that merely extending a connection over the telephone network to the service observing unit will not permit the calling party to monitor on any of the telephone circuits. Monitoring can only be accomplished after transmitting a special enabling code which unlocks or prepares the service observing unit for operation.

In this illustrative embodiment of my invention a five-digit code will be used to prepare the service observing unit. The code will be keypulsed by the observed into multifrequency receiver 214 and registered on the registration relays in FIGS. 3 and 4.

When cut-through relay 2C operated above as a result of the connection being established from the observer to the service observing unit, battery was extended through its operated contacts, through normal contacts of relay 3LI and over conductor 215 to the multifrequency receiver 214 to prepare the receiver for operation. Illustratively, multifrequency receiver 214 can be of the type shown in Patent 3,076,059 to L. A. Meacham et al. of Jan. 29, 1963 or Patent 3,128,349 to F. T. Boesch et al. of Apr. 7, 1964, and the Meacham et al., and the Boesch et al. patents are hereby incorporated by references as though fully disclosed herein. As set forth in these patents the receiver circuit receives multifrequency coded signals transmitted from a calling station. The coded signal comprise selected combinations of concurrent two-tone bursts, and each combination comprises one tone from a first frequency group and one tone from a second frequency group. Each tone operates a detector in the multifrequency receiver, and a check is made to assure that only one detector in each of the frequency groups is operated. If a valid check is made, direct-current signals are transmitted over and one-out-of-ten leads to a register circuit. In the instant drawing multifrequency receiver 214 receives the tone bursts over the telephone connection comprising tip and ring conductors 203 and 204, conductors 206, 207 and 210–213, and the one-out-of-ten output information appears as a ground on one of the digit leads D0–D9 in FIG. 2.

Let it be assumed that the unlocking code assigned to the service observing unit is 31789 and that the observer is now using her keyset to transmit tones over the connection representative of the first digit 3. Upon receipt of the proper tones representing the digit 3, multifrequency receiver 214 extends ground over digit conductor D3, through normal contacts of relay 4TT, over the conductor 300 to terminal TT3 which is part of the terminal group TT1 through TT9 in FIG. 4. From terminal TT3 ground is extended over cross-connection 400 to terminal TA, through normal contacts of relay 6A, over conductor 402 and through the winding of the first digit relay 4D1 to battery, operating the first digit relay 4D1. It will be noted that terminal TA can be cross-connected to any one of the terminals TT1–TT9 depending upon which digit has been selected for the first digit of the unlocking code.

When relay 4D1 operates it completes a circuit for extending its operating ground from conductor 402 over conductor 401 and through the winding of tens auxiliary relay 4TT, through normal contacts of relay 6TN or 6B, through normal contacts of relays 3D3 and 3R0, over conductor 405 and through operated contacts of relay 2C to ground. Relay 4TT does not operate at this time, however, since it has ground on both sides of its winding, but when the observer releases the key on her keyset and the tone burst is removed from the connection thus removing ground from conductors D3 and 402, relay 4TT operates to battery in series with the winding of relay 4D1.

With relay 4TT operated the digit conductors D1–D9 are disconnected from terminals TT1–TT9 and connected to contacts of units auxiliary relay 3UU in preparation for registering the next digit of the unlocking code.

Upon receipt of the digit 1, the second digit of the unlocking code, ground is extended from the multifrequency receiver 214 over digit conductor D1, through operated contacts of relay 4TT, over conductor 301, through normal contacts of relay 3UU, over conductor 302 and through the winding of units relay 3U1 to battery operating relay 3U1.

Turning now to FIG. 6, when relay 3U1 operates a circuit is completed for operating stepping relay 6SEL which advances the wiper of rotary selector switch 605 to the first contact of that switch. The circuit for operating the stepping relay can be traced from battery through its winding, over conductor 606, through operated contacts of units relay 3U1 and normal contacts of relay 3UU, over conductor 607, through normal contacts of relay 6B, over conductors 602 and 601 and through operated contacts of relay 2C to ground. Rotary switch 605 advances its wiper to contact 1 in preparation for the subsequent operation of relay 6A.

Relay 3U1 in operating also extends it operating ground in FIG. 3 over conductors 317 and 303, through the winding of relay 3UU, over conductor 304 to FIG. 4, through normal contacts of relay 6TN or 6B, through normal contacts of relays 3D3 and 3R0, over conductor 405 and through operated contacts of relay 2C to ground. Relay 3UU will not operate, however, since it has ground on both sides of its winding, but when the tone burst is removed from the connection at the end of the second digit, ground is disconnected from conductors D1 and 301 and units auxiliary relay 3UU operates in series with the winding of relay 3U1. At this point when relay 3UU operates, relay 6SEL releases leaving the wipers of switch 605 resting on contact 1 of that switch.

With units relay 3U1 operated and relay 3UU operated a circuit is completed for operating relay 6A in FIG. 6. This circuit can be traced from ground through operated contacts of relay 2C, over conductors 601, 602 and 603, through the wiper and contact 1 of rotary switch 605, over conductor 604, through operated contacts of relay 3UU to terminal UC, over cross-connection 608 to terminal UA1, through operated contacts of relay 3U1 to terminal UB1, over cross-connection 609 to terminal UD, through operated contacts of relay 4D1, over conductor 610 and through the winding of relay 6A to battery. It will be noted that terminals UC and UD are cross-connected to terminals UA1 and UB1, respectively, indicating that the digit 1 has been selected as the second digit of the unlocking code. It will be realized, of course, that the UC and UD terminals can be cross-connected to any of the other UA– or UB– terminals if other digits are assigned.

Relay 6A, in operating locks, through its own contacts, over conductor 611, through normal contacts of relay 3R0 and over conductors 612 and 601 to ground through operated contacts of relay 2C. Relay 6A also operates its transfer contacts in FIG. 6 to extend ground to capacitor C4, thereby discharging that capacitor. In addition, relay 6A closes its contacts in FIG. 3 to prepare for the operation of relay 3D3 if the correct digit is transmitted for the third digit of the unlocking code.

Assignment of the third digit depends on the cross-connection between terminal UH and one of the terminals UG1 through UG9 in FIG. 3. Since it has been assumed that the third digit of the unlocking code is the digit 7, terminal UH is cross-connected to terminal UG7.

When the next tone burst representing the digit 7 is received from the service observer at station 105, ground is extended over digit conductor D7 from multifrequency receiver 214, through operated contacts of relay 4TT, over conductor 305, through operated contacts of relay 3UU, over conductor 306 to terminal UG7, over cross-connection 307 to terminal UH, through operated contacts of relay 6A, over conductor 308, through normal contacts of relays 6B and 3V3 and through the winding of relay 3D3 to battery operating the third digit relay 3D3. Relay 3D3, in operating, locks to ground from the multifrequency receiver on conductor STR. Ground is present on conductor STR for the duration of the tone burst representing the third digit.

When relay 3D3 operates it causes several relays to release to recycle the register circuit in FIGS. 3 and 4. More specifically, relay 3D3 opens its contacts in FIG. 4 releasing relays 4TT and 4D1 which were held operated in series and also relays 3UU and 3U1 in FIG. 3 which were held in series to the same ground on contacts of relay 2C. Relay 6A remains operated, however, over the previously-described locking circuit. At the end of the tone burst representing the third digit of the unlocking code, ground is removed from conductor STR in the multifrequency receiver 214 thereby releasing relay 3D3 in FIG. 3.

With relays 4TT, 4D1, 3UU and 3U1 released the registration circuits in FIGS. 3 and 4 are recycled and prepared for the reception of the fourth and fifth digits of the unlocking code.

Upon the receipt of the fourth digit, which is the digit 8, ground is extended over digit conductor D8 from the multifrequency receiver 214, through normal contacts of relay 4TT, over conductor 309 to terminal TT8, over cross-conection 403 to terminal TB, through normal contacts of relay 6B, over conductor 404 and through the winding of the fourth digit relay 4D4 to battery. Relay 4D4 operates over this circuit and extends the operating ground through its own contacts, over conductor 401, through the winding of relay 4TT, through normal contacts of relay 6TN or 6B, through normal contacts of relays 3D3 and 3R0, over conductor 405 and through operated contacts of relay 2C to ground. Relay 4TT will not operate in the above circuit, however, since its winding has ground connected to both sides, but upon the removal of the tone burst representing the digit 8, the operating ground is removed from conductor 404 and auxiliary relay 4TT operates in series with the fourth digit relay 4D4.

Of course it will be realized that the fourth digit of the unlocking code can be changed from the numeral 8 to any of the other numerals by cross-connecting terminal TB to one of the other terminals TT1 through TT9.

The fifth or last digit of the unlocking code can now be transmitted. It has been assumed that the last digit is a 9, and when the observer transmits the tone burst representing the digit 9, ground is extended from multifrequency receiver 214 over digit conductor D9, through operated contacts of relay 4TT, over conductor 310, through normal contacts of relay 3UU, over conductor 311 and through the winding of units relay 3U9 to battery, operating relay 3U9. When units relay 3U9 operates ground in FIG. 6 is extended from operated contacts of relay 2C, over conductors 601 and 602, through normal contacts of relay 6B, over conductor 607, through normal contacts of relay 3UU, through operated contacts of relay 3U9, over conductor 606 and through the winding of relay 6SEL to battery, operating stepping relay 6SEL. When relay 6SEL operates the wiper on rotary swtich 605 advances from contact 1 to contact 2 in preparation for operating relay 6B.

Turning now to FIG. 3, when units relay 3U9 operated it extended its operating ground over conductors 314 and 303, through the winding of relay 3UU, over conductor 304 to FIG. 4, through normal contacts of relay 6TN or 6B, through normal contacts of relays 3D3 and 3R0 and over conductor 405 to ground through operated contacts of relay 2C. At the end of the tone burst representing the last digit of the unlocking code this operating ground is removed and auxiliary relay 3UU is permitted to operate in series with units relay 3U9.

When relay 3UU operates a circuit is completed for operating relay 6B in FIG. 6. This circuit can be traced from ground through operated contacts of relay 2C, over conductors 601, 602 and 603, through the wiper and contact 2 of rotary switch 605, over conductor 604 and through operated contacts of relay 3UU, over conductor 613 to terminal UE, over cross-connection 614 to terminal UA9, through operated contacts of relay 3U9 to terminal UB9, over cross-connection 615 to terminal UF, over conductor 616, through operated contacts of relays 4D4 and 6A, over conductor 617 and through the winding of relay 6B to battery. Relay 6B locks through its own contacts to ground on conductor 612. Relay 3UU, in operating, also releases relay 6SEL leaving the wiper of switch 605 resting on contact 2 of that switch.

When rotary switch 605 stepped off normal, that is, when the wiper advanced to contact 1, off-normal contacts ON of the rotary switch were operated. When relay 6B operates as a result of the receipt of the correct five digits of the unlocking code, ground is extended from conductor 602 through operated contacts of relay 6B, over conductor 618, through operated off-normal contacts ON and through the winding of relay 6RLS to battery, operating relay 6RLS. Relay 6RLS, in operating, releases rotary switch 605 restoring it to normal.

When relay 6B operates, amplifier 202 in FIG. 2 is coupled to the units selection circuit 500 and the tens selection circuits 501 and 502 via repeat coil 216, resistances R4 and R5, capacitors C5 and C6 and conductors 217 and 218 in preparation for subsequent monitoring. No circuits are being monitored, however, since all of the tens selection relays 4T1 through 4T9 are released at this time.

It will be recalled that when relay 6A operated after the second digit of the unlocking code was received a path was provided for discharging capacitor C4 in FIG.

6. When relay 6B now operates a path is once again completed for charging capacitor C4 through the winding of tone relay 6TN. This circuit can be traced from battery through the winding of relay 6TN, over conductor 600, through normal contacts of relay 3R0, over conductor 621, through operated contacts of relays 6B and 2C and through the resistance R3 to one side of capacitor C4. Having ground on the other side of the capacitor, the capacitor begins to charge causing sufficient current to flow through the winding of relay 6TN to operate that relay. Once the capacitor C4 is charged the current flow stops, and relay 6TN begins to release taking two to three seconds to fully release.

The operation of relay 6TN as previously described causes tone oscillator 209 to be momentarily connected to the connection established by the observer thus informing the observer that the service observing unit has been unlocked and is now ready for monitoring one of the designated telephone circuits.

In addition, the operation of relay 6TN recycles the register circuit in FIGS. 3 and 4 in preparation for the reception of a code to select a circuit for observation. Specifically, relay 6TN opens its contacts in FIG. 4 to release relays 4TT, 4D4, 3UU, and 3U9 which were being held operated from ground on conductor 405.

*Selecting telephone circuits for observation*

After the observer has dialed the unlocking or enabling code, the telephone circuits can be selected for observation. In this illustrative embodiment of my invention a two-digit code is used to operate a tens relay (4T–) and a units relay (3U–) to connect the tip and ring conductors of the telephone circuits to be monitored to the observer's station via amplifier 202.

Let it be assumed that the observer wants to monitor an operator trunk circuit 503 in FIG. 5 and the two-digit code asigned to this particular circuit is 10.

When the observer transmits the first tone burst representing the first digit 1, ground is extended from the multifrequency receiver 214, over digit conductor D1 through normal contacts of relay 4TT, over conductor 315 to terminal TT1 in FIG. 4, over cross-connection 406 to terminal TC1 and through the winding of tens relay 4T1 to battery, operating relay 4T1. Relay 4T1, in operating, extends its operating ground over conductors 408 and 401, through the winding of relay 4TT, through normal contacts of relay 6B or 6TN, through normal contacts of relays 3D3 and 3R0 and over conductor 405 to ground on operated contacts of relay 2C. Relay 4TT is prevented from operating at this time since its winding is grounded on both sides, but at the cessation of the tone burst ground is removed by multifrequency receiver 214 from conductor D1, and relay 4TT operates in series with the winding of relay 4T1. When relay 4TT operates digit conductors D0–D9 are extended to the windings of the units relays 3U0–3U9 in preparation for receiving the units digit of the code assigned to the selected telephone circuit.

The observer now transmits the digit 0 which causes ground to be extended from multifrequency receiver 214, over digit conductor D0, through operated contacts of relay 4TT, through normal contacts of relay 3UU, over conductor 312, and through the winding of relay 3U0 to battery, operating relay 3U0. When relay 3U0 operates, the ground on conductor 312 is extended over conductors 313 and 303, through the winding of relay 3UU to conductor 304, through normal contacts of relay 6TN or 6B, and through normal contacts of relays 3D3 and 3R0 to ground over conductor 405 from operated contacts of relay 2C. Having ground on both sides of its winding, relay 3UU is once again shunted down until the end of the tone burst for the units digit when ground is removed from digit conductor D0. At this time, relay 4UU is permitted to operate in series with relay 3U0.

With the units relay 3U0 operated and the tens relay 4T1 operated, the tip and ring conductors T10 and R10 of trunk 503 are extended through operated contacts of relay 4T1 in FIG. 5, over conductors T0 and R0, through operated contacts of units relay 3U0, over conductors 508 and 509, through operated contacts of relay 6B, over conductors 217 and 218 to FIG. 2, through capacitors C5 and C6 and resistances R4 and R5 to repeat coil 216. Repeat coil 216 and the resistance and capacitance network represent a high impedance coupling network for coupling amplifier 202 to trunk circuit 503. The gain of amplifier 202 can be adjusted to compensate for the transmission loss through the high impedance coupling, and the amplifier can be arranged to prevent the transmission of voice or tone signals from the observer to the circuit being monitored.

To establish a new selection the observer merely releases the monitoring connection to the existing telephone circuit by first transmitting the digit 0 for two or more seconds and then transmitting the two-digit code assigned to the newly selected circuit.

When the observer transmits the digit 0 to release the first circuit, ground is extended from multifrequency receiver 214, over digit conductor D0, through operated contacts of relays 4TT and 3UU, through thermistor RT2 and through the winding of release relay 3R0 to battery, operating relay 3R0 after a short delay due to thermistor RT2. Relay 3R0 locks through its own contacts to ground which exists on conductor STR as long as the tone burst is being received by multifrequency receiver 214. Relay 3R0 has been purposely made slow-to-operate to prevent a release of the selected circuit due to the accidental transmission of the digit 0 or equivalent extraneous voice frequency signals.

Relay 3R0, in operating, opens its contact in FIG. 4 to remove the holding ground from relays 4T1, 4TT, 3U0 and 3UU, and these relays release disconnecting amplifier 202 from trunk circuit 503. In addition, relay 3R0 discharges capacitor C4 in FIG. 6. At the end of the transmission of the digit 0 by the observer, relay 3R0 releases, and relay 6TN is once again reconnected in series with capacitor C4 permitting capacitor C4 to charge and tone relay 6TN to momentarily operate. The momentary operation of relay 6TN causes tone oscillator 209 to transmit a tone burst to the observer indicating that a new service observing selection can now be made.

If, for example, the operator now transmits the digits 21, the tens relay 4T2 would be operated along with the units relay 3U1, and trunks circuits 504 identified by the code 21 would be connected to amplifier 202 for service observing.

If the monitoring of a selected circuit is to be continued for a considerable interval, the monitoring circuit can be locked to that selected circuit by the transmission of the digit 9. Upon receipt of the digit 9, ground is extended over digit conductor D9 from multifrequency receiver 214, through operated contacts of relay 4TT, over conductor 310, through operated contacts of relay 3UU, over conductor 316 through operated contacts of relay 6B, through thermistor RT3 and through the winding of lock-in relay 3LI to battery. Relay 3LI operates over this circuit and locks to ground through operated contacts of relay 2C. In operating, relay 3LI removes battery from conductor 215 to disable multifrequency receiver 214 so that subsequent selections cannot be made over the established connection. In order for the observer to make a new selection she must re-establish a connection to the service observing unit by keying the number assigned thereto and unlock the unit as described above.

When the observer wishes to release the connection to the service observing unit, she replaces her telephone receiver at station 105 thereby releasing line finder 100, first selector 101 and connector 200. Connector 200 in releasing releases hold relay 2H which releases relay 2C. Relay 2C in releasing opens its contacts in FIG. 4 to release any of the 4D, 4D4, 4TT, 4T–, 3UU and 3U– relays in FIGS. 3 and 4. Also relay 3C opens its contacts in FIG. 6 to release relays 6A and 6B, and relay 2C opens its contacts in FIG. 2 to restore multifrequency receiver 214 and amplifier 202 to normal. Furthermore, relay 2C restores its transfer contacts in FIG. 2 to normal reconnecting relay 2R to connector bank 201 in preparation for subsequent reseizure of the unit by a connector switch.

*Lockout circuitry*

From the foregoing description it was apparent that unauthorized persons were precluded from using the service observing unit in a number of ways. For example, the directory number assigned to the particular units, the special codes for unlocking or enabling each unit and the codes used for selecting a particular telephone circuit for observation are kept secret and are only known to personnel whoe are authorized to perform service observing. Nevertheless, in the event that someone should inadvertently become connected to the service observing unit, I have provided additional features to safeguard against unauthorized monitoring.

It will be recalled that each time one of the units relays (3U0 through 3U9) operated, a circuit was closed for operating relay 6SEL and advancing rotary switch 605 one step. If the correct unlocking code is transmitted on the first attempt, two units relays would have operated, the wiper of switch 605 would have advanced to contact 2 and relay 6B would have operated connecting the amplifier 202 to thetens and units selection relays and releasing rotary switch 605. On the other hand, if the observer transmitted the wrong unlocking code, relay 6B would not have operated and rotary switch 605 would remain with its wiper resting on contact 2. Not having received tone from oscillator 209, indicating that a selection can be made, the observer would then transmit the digit 0 to operate release relay 3R0 and release the operated registration relays in FIGS. 3 and 4. In the alternative the calling party may disconnct and re-establish a connection to the observing unit instead of transmitting the digit 0. In any event, the observer would then attempt to retransmit the unlocking code. When the units relays are again operated as a result of the new code sequence, the wiper of rotary switch 605 advances two more positions from contact 2 to contact 4. If the wrong unlocking code is once again received, the observer must transmit the digit 0 to release the registration relays and try again. On the third attempt the wiper of switch 605 is advanced to contact 6. It can be seen from FIG. 6 that contact 6 of rotary switch 605 is the last contact that will permit relay 6B to operate and thereby enable the observer to monitor on selected telephone circuits. If the observer has made three unsuccessful attempts to unlock the service observing unit and tries the fourth time, ground is extended over contact 8 of switch 605 and over conductor 619 to operate tone relay 6TN and transmit steady tone to the observer. Since rotary switch 605 has stepped beyond contact 6, the last contact which would permit operation of relay 6B and the connection of amplifier 202 to one of the selected telephone circuits, the service observing unit is effectively disabled until key 620 is momentarily operated. When key 620 is operated, ground is extended over conductor 618, through operated off-normal contacts ON and through the winding of relay 6RLS operating relay 6RLS and restoring rotary switch 605 to normal.

It might be said that rotary switch 605 and its related circuitry functions as a counting circuit to count the number of times an unlocking code is transmitted thus preventing one from discovering the correct unlocking code by the application of codes selected at random. In this illustrative embodiment of my invention relay 6B is connected to contact 6 of the rotary switch allowing the calling party to transmit no more than three five-digit unlocking codes before the service observing unit is disabled as described above.

When the lockout occurs, lamp 6L0 is lighted over an obvious circuit through switch 621 which is also activated by stepping relay 6SEL. Lamp 6L0 informs the maintenance man at the service observing unit that someone has attempted to gain access to the service observing unit by dialing a series of erroneous unlocking codes. Once the service observing unit has been locked out, subsequent calls to the unit will result in a steady tone being immediately transmitted to the calling party informing it that the circuit has been locked out.

Turning now to FIG. 3 it will be recalled that the third digit of the unlocking code was selected by cross-connecting terminal UH to one of the terminals UG1 through UG9. The remaining terminals are cross-connected to vacant code terminal VC, and in the event the observer transmits an improper third digit, relay 3V3 operates. In operating, relay 3V3 locks to ground on conductor 304. Relay 3V3 also opens its normal contacts to prevent the operation of relay 3D3 which, as mentioned above, recycles the registration relays in FIGS. 3 and 4. To restore the service observing unit so that it will respond to the proper unlocking code after the transmission of the incorrect third digit, the observer must transmit the digit 0 which operates release relay 3R0 to release relay 3V3 and any of the operated registration relays.

It is to be understood that the above-described arrangements are merely illustrative of the applications of the principles of the invention. Numerous other arrangements may be devised by those skilled in the art without departing from the spirit and scope of the invention.

What is claimed is:

1. In a telephone system, a plurality of customer lines including signaling means, a plurality of communication circuits, service observing means, and means responsive to any one of said lines for interconnecting said one line with said service observing means, said service observing means comprising means effective when enabled for coupling said one line with selected ones of said circuits for monitoring said selected circuits from said one line, and means responsive to a first signal from said one line for enabling said coupling means and responsive to signals from said one line other than said first signal for disabling said coupling means.

2. The invention defined in claim 1 wherein said service observing means comprises means effective when said coupling means is enabled for coupling said one customer line to different ones of said communication circuits in accordance with additional signals transmitted from said one line.

3. In a telephone system, a plurality of customer lines each including signal means, a plurality of communication circuits, means for monitoring on selected ones of said circuits, means for controlling said monitoring means, and means responsive to a first signal from any one of said lines for establishing a connection between said one line and said monitoring means, said control means comprising means responsive to a particular second signal from said one line connected thereto for rendering said control means effective, means responsive to a third signal from said one line for connecting said monitoring means to a selected one of said circuits, and means responsive to the receipt of a second signal other than said particular second signal for blocking the connection of said monitoring means to said circuits.

4. In a telephone system, a plurality of customer lines each including signaling means, a plurality of telephone circuits, service observing means, and means controlled by a calling one of said customer lines for establishing a connection to said service observing means, said service observing means comprising monitoring means, selecting means effective when operated for selectively connecting said monitoring means to said circuits, gating means for blocking the operation of said selecting means upon the establishment of a connection from said one line to said service observing means, and means responsive to the receipt of a predetermined coded signal from said one line for unblocking said gating means to permit the operation of said selecting means.

5. The invention defined in claim 4 wherein said coded signal comprises a multidigit signal and wherein said gating means comprises a digit register for storing less than the number of digits than in said multidigit signal and means for recycling said digit register.

6. The invention defined in claim 5 wherein said recycling means comprises means responsive to certain digits of said multidigit signal for recycling said digit register.

7. In a telephone system, a plurality of customer lines each including signaling means, a plurality of telephone circuits, service observing means, and means controlled by a calling one of said lines for establishing a connection between said calling line and said service observing means, said service observing means comprising monitoring means coupled to said calling line connection, means effective when operated for coupling said monitoring means to selected ones of said telephone circuits, gating means for initially blocking the operation of said coupling means upon the establishment of said connection to said calling line, means responsive to a predetermined coded signal from said calling line for unblocking said gating means, and means responsive to the receipt of a second coded signal from said calling line when said gating means is unblocked for operating said coupling means to couple said monitoring means to a particular one of said telephone circuits selected in accordance with said second coded signal.

8. The invention defined in claim 7 wherein said service observing means also comprises means responsive to a first special signal from said calling line for releasing said coupling means to enable said calling line to select other of said telephone circuits by the transmission of other coded signals.

9. The invention defined in claim 8 wherein said service observing means further comprises means responsive to a second special signal from said calling line for locking said monitoring means to the last selected telephone circuit.

10. In a telephone system, a plurality of customer lines each including signaling means, a plurality of telephone circuits, service observing means, and means controlled by a caling one of said ines for estabishing a connection between said calling line and said service observing means, said service observing means comprising means for coupling said calling line with selected ones of said telephone circuits for observing thereon and means for enabling said coupling means only in response to a particular coded signal from said calling line, said particular coded signal comprising a plurality of individual signals transmited from said calling line in a predetermined sequence, and said enabling means comprising means responsive to the receipt of said individual signals for disabling said coupling means when said individual signals are received in a sequence other than said predetermined sequence.

11. In a telephone system, a plurality of customer lines each including means for transmitting signals, telephone circuits, service observing means, and means controlled by a calling one of said lines for establishing a connection from said calling line to said service observing means, said service observing means comprising means for coupling said calling line with selected ones of said telephone circuits for monitoring thereon independently of the busy condition of said circuits, means for registering signals from said calling line, means effective when an unlocking signal is registered in said registering means for enabling said coupling means, and means effective when a predetermined number of other signals are registered prior to said unlocking signal for disabling said coupling means to block the monitoring of said telephone circuits.

12. The invention defined in claim 11 wherein said coupling means comprises amplifying means coupled to said calling line and means for selectively connecting said amplifying means to different ones of said telephone circuits; wherein said unlocking signal comprises a predetermined sequence of individual signals; wherein said registering means comprises a first register circuit, a second register circuit and means for selectively directing different ones of said individual signals to said first and second register circuits; wherein said enabling means comprises a first checking circuit operable upon receipt of said individual signal representing a first portion of said unlocking code and a second checking circuit operable when said first checking circuit is operated and upon receipt of said individual signals representing a second portion of said unlocking code to actuate said connecting means; and wherein said disabling means comprises means for counting the number of individual signals received prior to the actuation of said connecting means.

13. The invention defined in claim 12 wherein said checking circuits comprise means for selectively altering the response of said checking circuits to individual signals representative of different unlocking codes.

14. The invention defined in claim 13 wherein said register circuits comprise a plurality of first relays each having a winding responsive to one of said individual signals and contacts controlled by said winding, wherein said connecting means comprises certain of said register relay contacts, and wherein said checking circuits include second relays and other of said register relay contacts.

15. In combination, a telephone system comprising a plurality of equipment terminals each identified by an address code, service observing means connected to one of said terminals, customer stations connected to other of said terminals and including means adapted to transmit a plurality of signals, communication circuits, and switching means responsive to signals from a calling one of said stations indicative of the terminal address code of said service observing means for interconnecting said calling station with said service observing means; said service observing means comprising, means for coupling said calling station with selected ones of said communication circuits for monitoring service thereon, a signal receiver having a plurality of outputs each corresponding to a signal from said calling station, a plurality of first register means comprising means for selectively connecting certain of said first register means to certain of said outputs to register signals received thereon, gating means including said register means and operable only in response to the receipt of a predetermined sequence of signals from said calling line for actuating said coupling means and a plurality of second register means effective when said gating means is operated for registering signals from said calling station for causing said coupling means to interconnect said calling station with different ones of said communication circuits depending on the particular signal registered therein.

16. The invention defined in claim 15 wherein said first and second register means comprise a memory circuit adapted to store a first portion of the signals received in said predetermined sequence and means connected to one of said receiver outputs for recycling said memory means to receive other of said signals in response to a predetermined signal from said calling station.

References Cited

UNITED STATES PATENTS 3,155,781 11/1964 Ulmer ------------ 179—175.2

KATHLEEN CLAFFY, *Primary Examiner.*

A. McGILL, *Assistant Examiner.*